US009616504B2

(12) United States Patent
Estancona Ercilla

(10) Patent No.: US 9,616,504 B2
(45) Date of Patent: Apr. 11, 2017

(54) MILLING MACHINE

(71) Applicant: GEPRO SYSTEMS, S.L., Durango (Vizcaya) (ES)

(72) Inventor: Jose Antonio Estancona Ercilla, Durango (ES)

(73) Assignee: GEPRO SYSTEMS, S.L., Durango (ES)

( * ) Notice: Subject to any disclaimer, the term of this patent is extended or adjusted under 35 U.S.C. 154(b) by 168 days.

(21) Appl. No.: 14/385,176

(22) PCT Filed: Mar. 5, 2013

(86) PCT No.: PCT/ES2013/070133
§ 371 (c)(1),
(2) Date: Sep. 15, 2014

(87) PCT Pub. No.: WO2013/140005
PCT Pub. Date: Sep. 26, 2013

(65) Prior Publication Data

US 2015/0043986 A1 Feb. 12, 2015

(30) Foreign Application Priority Data

Mar. 20, 2012 (ES) .................................. 201230414

(51) Int. Cl.
*B23C 1/04* (2006.01)
*B23Q 1/26* (2006.01)
(Continued)

(52) U.S. Cl.
CPC ................ *B23C 1/04* (2013.01); *B23C 1/002* (2013.01); *B23C 1/007* (2013.01); *B23C 1/12* (2013.01);
(Continued)

(58) Field of Classification Search
CPC . Y10T 409/307672; Y10T 409/307784; Y10T 409/308232; Y10T 409/30392;
(Continued)

(56) References Cited

U.S. PATENT DOCUMENTS 2,064,172 A * 12/1936 Lofstedt .................... B23C 3/13 409/136
3,371,580 A 3/1968 Barnes et al.
(Continued)

OTHER PUBLICATIONS

International Search Report issued Jul. 17, 2013 in International (PCT) Application No. PCT/ES2013/070133.

*Primary Examiner* — Daniel Howell
*Assistant Examiner* — Yasir Diab
(74) *Attorney, Agent, or Firm* — Wenderoth, Lind & Ponack, L.L.P.

(57) ABSTRACT

A milling machine including a frame (2) having a work surface (2.1) disposed in a vertical plane and a C-shaped moving bridge (3). In addition, the machine includes: at least three heads (7), each head including a machining spindle (15); and five movement axes (X, Y, Z, A, B), such that the moving bridge (3) is moved by the frame (2) along a horizontal axis (X). Each head (7) is moved independently on the moving bridge (3) along a vertical axis (Y) in order to be moved towards or away from the work surface (2.1) along a depth axis (Z) perpendicular to both the horizontal axis (X) and the vertical axis (Y), as well as rotating independently about a first axis of rotation (A). Each spindle (15) rotates independently about a second axis of rotation (B).

15 Claims, 9 Drawing Sheets

(51) Int. Cl.
*B23Q 1/01* (2006.01)
*B23Q 1/54* (2006.01)
*B23Q 39/02* (2006.01)
*B23C 1/00* (2006.01)
*B23C 1/12* (2006.01)
*B23Q 1/62* (2006.01)
*B23Q 5/32* (2006.01)
*B23Q 39/00* (2006.01)
*B23Q 11/08* (2006.01)

(52) U.S. Cl.
CPC ............... *B23Q 1/015* (2013.01); *B23Q 1/26* (2013.01); *B23Q 1/5406* (2013.01); *B23Q 1/626* (2013.01); *B23Q 39/024* (2013.01); *B23Q 39/025* (2013.01); *B23C 2220/32* (2013.01); *B23Q 5/32* (2013.01); *B23Q 11/08* (2013.01); *B23Q 2039/002* (2013.01); *B23Q 2039/006* (2013.01); *Y10T 409/30392* (2015.01); *Y10T 409/307672* (2015.01); *Y10T 409/307784* (2015.01); *Y10T 409/307896* (2015.01); *Y10T 409/308232* (2015.01); *Y10T 409/308344* (2015.01); *Y10T 409/308568* (2015.01); *Y10T 409/309576* (2015.01)

(58) Field of Classification Search
CPC . Y10T 409/308512; Y10T 409/309576; Y10T 409/308344; Y10T 409/308568; B23Q 3/088; B23Q 2703/04; B23Q 2705/026; B23Q 11/08; B23Q 5/32; B23Q 5/326; B23Q 2039/002; B23Q 2039/006
USPC ............................................................ 269/21
See application file for complete search history.

(56) References Cited

U.S. PATENT DOCUMENTS 3,413,893 A * 12/1968 Wilson ...................... B23C 1/12 409/201
3,442,175 A 5/1969 Heap et al.
3,552,264 A * 1/1971 Meinke ................. B23B 39/162 408/42
3,602,094 A 8/1971 Bardiau
3,682,560 A * 8/1972 Suizu ...................... B23B 39/18 408/46
3,859,001 A * 1/1975 Hoddinott ................ B23Q 1/70 408/10
3,976,386 A * 8/1976 Marantette ............. B23B 39/18 408/136
5,743,685 A * 4/1998 Piggott ................. B25B 11/005 269/21
7,128,506 B2 * 10/2006 Ferrari ............... B23Q 17/2233 408/1 R
7,261,503 B2 * 8/2007 Motta .................... B23Q 1/015 310/12.04
2003/0121362 A1 * 7/2003 Goellner ............ B23Q 11/0816 74/608
2010/0178125 A1 * 7/2010 Tatsuda ................ B23Q 1/5406 409/183
2011/0014001 A1 * 1/2011 Takahashi .............. B23Q 11/04 409/131
2011/0131791 A1 * 6/2011 Haas .................. B23Q 3/15746 29/563

* cited by examiner

MILLING MACHINE

OBJECT OF THE INVENTION

The present invention relates to a configuration and design of a milling machine with a work surface arranged in a vertical plane and a moving bridge, comprising a total of at least 3 heads, in order to provide high production capacity, efficient machining, saving floor space and easy waste disposal.

BACKGROUND OF THE INVENTION AND TECHNICAL PROBLEM THAT IS RESOLVED

Currently both the milling machines that comprise a single fastened head, with a work table arranged in a horizontal plane being the one that moves, as well as milling machines that comprise a single head, in this case moving, with the horizontally-arranged work table being the one which is kept fastened, are very well known. In both cases there is a limited machining capacity given that for parts of large dimensions a single head requires an extensive machining period. In the case in which it is the work table that is moved, it is not possible to previously palletise the workpiece and therefore take full advantage of the capacity of the machine. Another inconvenience is that the load moved along the work table is variable depending on the weight of the workpiece, and if this weight is high, it negatively affects the dynamics in the machining.

There are also known milling machines with work tables arranged in a horizontal plane which comprise more than one head, but the problem of said machines reside in the heavy structure which is necessary to be enable the heads to move on five axes, which makes said machines unsuitable to produce complex geometric parts, such as aeronautical parts, with high velocities and accelerations in order to achieve high productivity. On the other hand, the heads of said machines keep the distance between them fixed, with the machining by panoplies not being possible, with the consequent waste of material and the increase of the production cost.

These configurations therefore carry a high number of unproductive movements, bringing an undesired increase in the manufacturing time and an inefficient use of the raw material. These circumstances translate into cost increase of the machining process, and therefore a cost increase of the final product.

On the other hand there are disadvantages that the horizontal arrangement of the work surface brings. One of them is the high occupied space which it entails and another is the difficult disposal of waste linked to the machining process. The fact of reducing the occupied floor space may entail not needing to expand the factory facilities so as to be able to house all of the machinery, as well as a greater ease and efficiency in the movements of all of the resources which are to be found in a factory. On the other hand, machining the workpieces on a horizontal surface makes the disposal of the waste truly difficult, involving consumption of additional resources, or in other words, making the machining process more expensive.

Nowadays, the market demands a high degree of flexibility and efficiency, and the use of each and every one of the resources is of great importance. For this reason the present invention presents a milling machine that has a great production capacity with more efficient machining on five axes. Particularly for parts with complicated geometry, obtaining very few contouring errors, given that they comprise at least three heads with mutually independent mobility, a robust and light moving structure, whilst saving floor space and greatly easing the disposal of waste due to the vertical arrangement of the machine.

DESCRIPTION OF THE INVENTION

With the aim of achieving the objectives and avoiding the inconveniences mentioned in the previous sections, the invention proposes a milling machine that comprises a frame, which comprises a work surface arranged in a vertical plane, and a C-shaped moving bridge.

The present invention furthermore comprises at least three heads (7), each one of which comprises a machining spindle (15), and five movement axes, in such a way that the moving bridge is moved along the frame according to a horizontal axis, each head is independently moved on the moving bridge according to a vertical axis that is perpendicular to the horizontal axis, each head is moved on the moving bridge in order to be moved towards or moved away from the work surface according to a depth axis that is perpendicular to the horizontal axis and the vertical axis, and each head also independently performs rotating movements according to a first axis of rotation, and each machining spindle independently performs rotating movements according to a second axis of rotation.

A very important characteristic of the present invention is that each machining spindle is moved independently according to at least three of the five axes, providing a milling machine with machining flexibility, lowering the manufacturing costs by minimising the material used due to the possibility of machining by panoplies and with the bench arranged in a vertical plane such that it reduces the occupied floor place.

Another characteristic of the present invention is that it comprises a rotating servomotor for the movement of the heads on the moving bridge according to the depth axis, whilst each of the rest of the axes comprises at least one drive case, each drive case comprising at least one precision gearbox, and each precision gearbox comprising at least one rotating servomotor, where the rotating movement which each servomotor transmits is controlled electronically.

The milling machine also comprises linear guides with recirculating rollers, at least one slide on the moving bridge, at least one gear shaft of the horizontal axis on the moving bridge, and at least one horizontal rail on the frame, each horizontal rail in turn comprising at least one rack, such that the moving bridge is moved along the frame according to the horizontal axis.

The milling machine can comprise at least two gear shafts of the vertical axis, at least one vertical rail which in turn comprises a rack, and a locking and unlocking system. This locking and unlocking system in turn comprises a toothed interlocking system, at least two hydraulic cylinders, and at least two axes, such that each head is moved on the moving bridge according to the vertical axis.

The present invention can also comprise at least one depth groove for each head, at least one depth rail for each head, a first pulley and a second pulley, besides a mechanical transmission means, such that each head is moved on the moving bridge according to the depth axis.

A characteristic of the present invention is that it comprises at least one gear for each head, a toothed crown for each head, such that each head rotates independently according to the first axis of rotation, besides being able to comprise at least one pinion for each machining spindle, and a rack of the second axis of rotation, such that each machining spindle rotates independently according to the second axis of rotation.

The milling machine of the present invention can comprise one felted pinion as an element for applying lubricant, a handling cell that may be moved in three mutually perpendicular directions, and at least one vacuum table arranged parallel over the work surface in order to hold the workpieces to be machined using depression.

Another characteristic of the present invention is that it comprises protections selected amongst fixed protections, moving protections, hinged protections, rolling protections and a combination of the above. At least one of the protections selected amongst fixed, moving, hinged, and rolling protections, and combinations thereof, serves as a vertical channel for waste from the machining process.

DESCRIPTION OF THE DRAWINGS

For an easy understanding of the description which is being made, the invention is complemented with a set of drawings where with an illustrative and non-limitative character the following has been represented.

Figure 1:
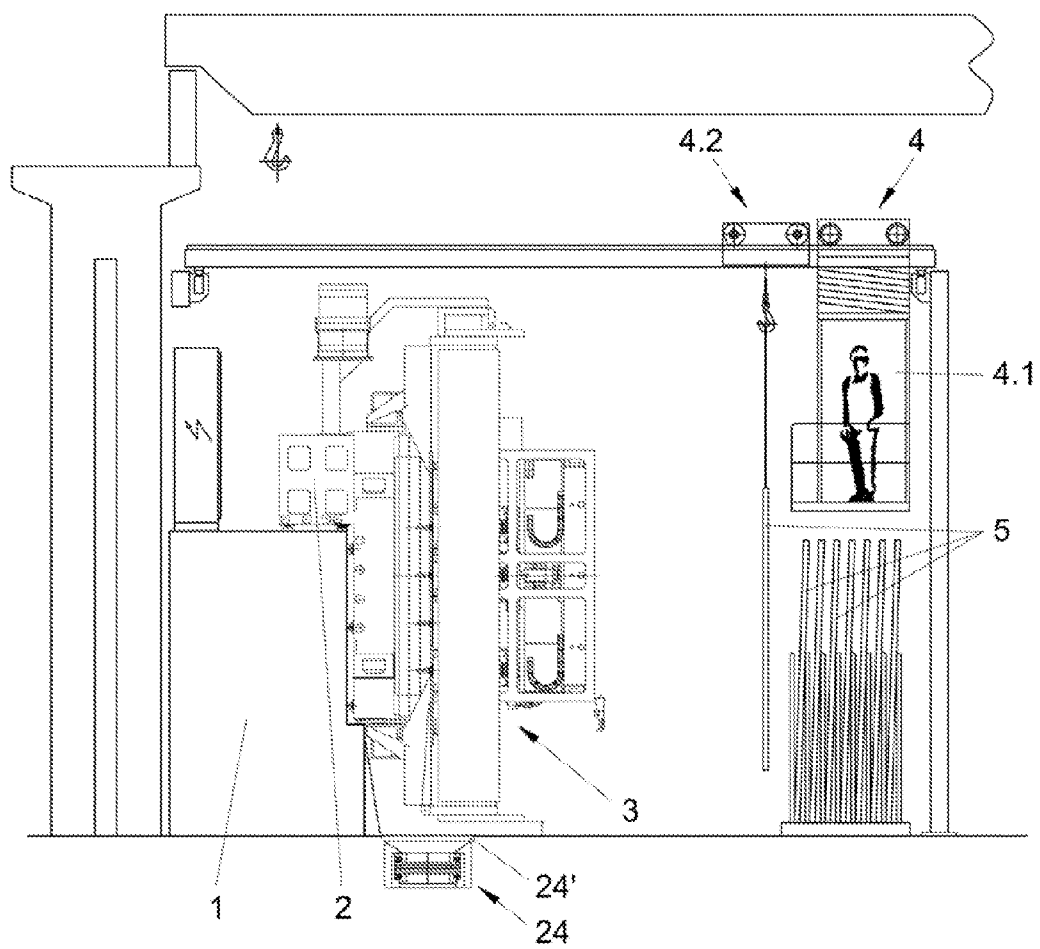
FIG. 1 shows an elevation view of a milling machine object of the invention.

Below is a list of the different elements represented in the figures that make up the invention:

X=Horizontal axis
Y=Vertical axis
Z=Depth axis
A=First axis of rotation
B=Second axis of rotation
1=Civil engineering work
2=Frame
2.1=Work surface
2.2=Vacuum table
2.3=Stop
3=Moving bridge
3.1=Main structure
3.2=Reinforcing element
3.3=Column
4=Handling cell
4.1=Cab
4.2=Crane
5=Workpiece
6=Protections
6.1=Fixed protection
6.2=Moving protection
6.3=Hinged protection
6.4=Rolling protection
7=Heads
7.1=Upper head
7.2=Central head
7.3=Lower head
8=Carts
8.1=Upper cart
8.2=Central cart
8.3=Lower cart
9=Cart carrier
9.1=Upper cart carrier
9.2=Central cart carrier
9.3=Lower cart carrier
10=Beam-column
11=Shaft
12=Hydraulic cylinder
13=Drive cases
13.1=Drive case of the horizontal axis X
13.2=Drive case of the vertical axis Y
13.3=Rotating servomotor of the depth axis Z
13.4=Drive case of the first axis of rotation A
13.5=Drive case of the second axis of rotation B
14.1=Crown wheel of the first axis of rotation A
14.2=Rack of the second axis of rotation B
15=Machining spindle
16.1=Horizontal rail
16.2=Vertical rail
16.3=Depth rail
17=Slides
18=Felted pinion
19=Perforations
20=Gear shaft of the horizontal axis (X)
21=Gear shaft of the vertical axis (Y)
22.1=Vertical groove
22.2=Depth groove
23=Pinion of the second axis of rotation B
24=Disposal tank
24'=Grid
25.1=First pulley
25.2=Second pulley
26.1=Horizontal rack
26.2=Vertical rack
27.1=Drive shaft
27.2=Feed spindle

DETAILED DESCRIPTION OF THE PREFERRED EMBODIMENT OF THE INVENTION

As it has already been indicated, and as it can be seen in FIG. 1, the present invention comprises a milling machine which may have such dimensions that the arrangement of a work surface (2.1) of a frame (2) on a vertical plane is very important.

Preferably, the machine is inserted in a civil engineering work (1) of reinforced concrete, given the essential requirement of being fully sustained, not only due to the weight of the machine itself, but also due to the forces of inertia generated by a moving bridge (3) which is moved along the frame (2). Furthermore, in addition to the arrangement of the milling machine on one face of the civil engineering works (1), a second milling machine object of the present invention can be assembled on the opposite face of said civil engineering work (1), in parallel to the first, taking advantage of the floor space even more in comparison with a horizontal arrangement of the work surface (2.1).

Given the large dimensions that the milling machine may reach, and the vertical arrangement of the work surface (2.1), the invention preferably comprises a handling cell (4) which makes it possible to monitor the different machining operations, as well as a clear view of workpieces (5) which previously require to be positioned, centred and secured. From the handling cell (4) the handling of a crane (4.2) responsible for raising and transferring the workpieces (5) is performed, for which it is very important that a cab (4.1) comprised by the handling cell (4) may be moved in three mutually perpendicular directions.

Figure 2:
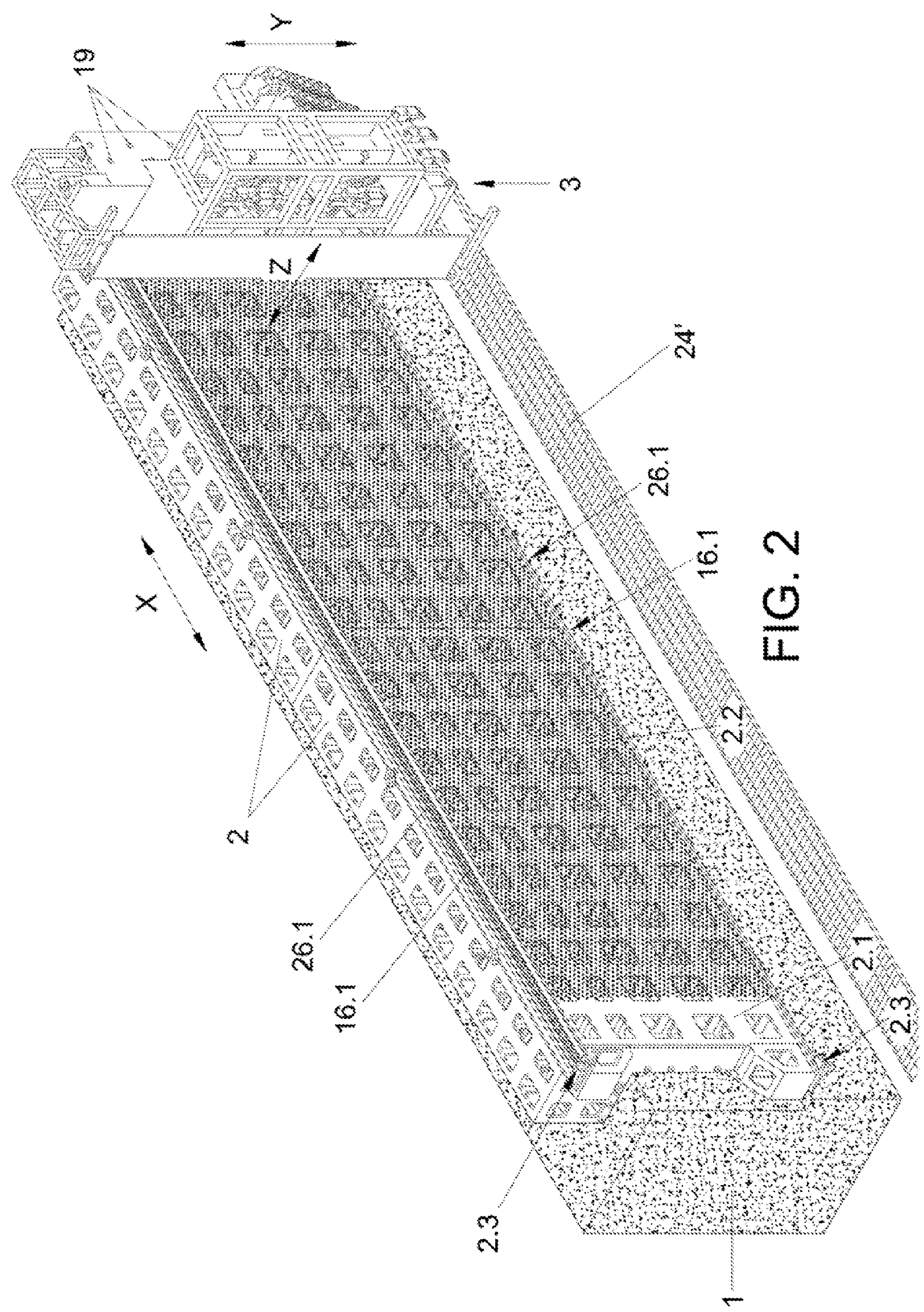
FIG. 2 shows a perspective view of the milling machine object of the invention partially inserted in a civil engineering work.

In FIG. 1 there is also a disposal tank (24) under the ground level, in such a way that over the disposal tank (24) there is the work surface (2.1) and the part of the moving bridge (3) with which is carried out the machining operations. FIG. 2 shows how said disposal tank (24) comprises a grid (24') on the ground which extends along the whole course of the moving bridge (3) on the work surface (2.1). The purpose of the grid (24') is that of filtering waste of large dimensions, whilst providing the possibility of stepping onto the area next to the work surface (2.1) without the risk of falling into the disposal tank (24).

FIG. 2, besides helping to define the arrangement of the disposal tank (24) which appears in FIG. 1, shows the frame (2), which comprises the work surface (2.1) over which a vacuum table (2.2) is preferably situated in order to hold the workpieces (5). It is in FIG. 2 where it can be seen with greater clarity how the frame (2) is partially inserted in the civil engineering work (1) for its total immobilisation. The C-shaped moving bridge (3) is also seen, which is described more in-depth further ahead.

On the vacuum table (2.2), which is fixed over the work surface (2.1) through special screws to support large loads, is where the workpieces (5) to be machined are secured. This vacuum table (2.1) is preferably manufactured in aluminium alloy, principally due to the combination of rigidity and lightness that it brings. On the other hand, said vacuum table (2.2) has some transversal and longitudinal grooves in its surface forming a series of grid lines, not shown in detail in the figures, for the placement of O-ring seals as a delimitation of the vacuum area.

Moreover, in the intersection of the aforementioned transversal and longitudinal grooves, and at defined distances, there are holes through which the vacuum flow is introduced into the delimited area through the seals. The holes that are not used during a machining process are plugged using threaded pins which have O-ring seals to avoid leakage, enabling itself to efficiently adjust to different sized workpieces (5) to be machined.

Given that the immobilisation of the workpiece (5) during the machining is preferably through vacuum, the depression of the suction must overcome the stress created through the gravity, thus avoiding any movement of the workpiece (5) after the calibration of its positioning. Additionally any type of grips can be used to secure the hold on the workpieces (5) as long as they do not keep the moving bridge (3) from passing over the vacuum table (2.2) on which the workpiece (5) to be machined is placed.

Figure 3:
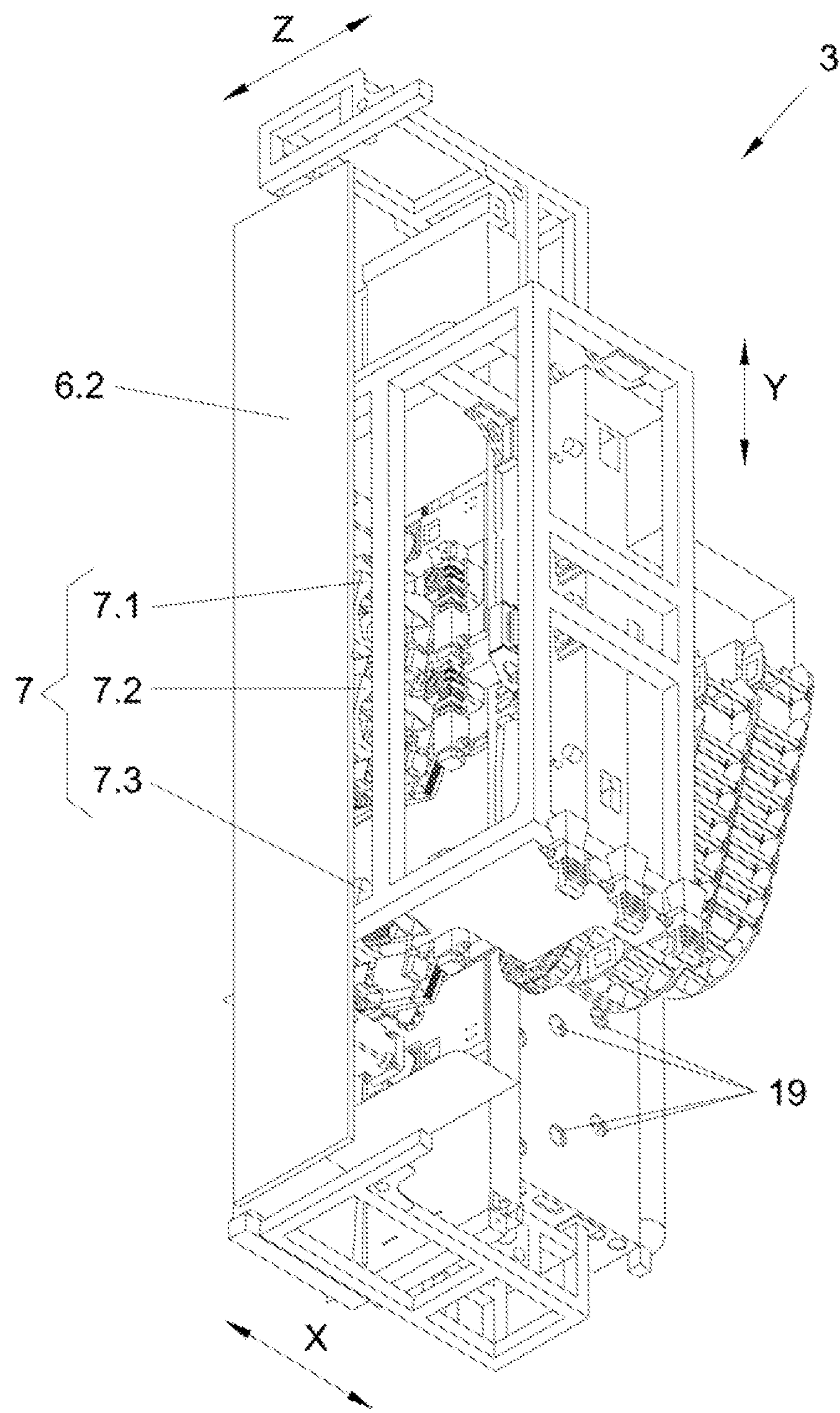
FIG. 3 shows a perspective view of a moving bridge comprised by the milling machine object of the invention.

In FIGS. 2 and 3 a horizontal axis (X) is seen which indicates the direction of the movement of the moving bridge (3) over the work surface (2.1), a vertical axis (Y) which indicates the direction of the movement, in this case, of heads (7) such as an upper head (7.1), a central head (7.2) and a lower head (7.3), on the moving bridge (3), and a depth axis (Z) which marks the movements that the heads (7) perform on the moving bridge (3) in order to move towards or move away from the workpieces (5) to be machined once fastened to the vacuum tables (2.2). On the other hand, a first axis of rotation (A) and a second axis of rotation (B), indicated in FIGS. 6 and 7 respectively are perpendicular to each other and are envisaged as being on the same plane, providing a greater degree of flexibility in machining by allowing the various heads to move independently between them, according to the first axis of rotation (A), as well as to the second axis of rotation (B).

Figure 4:
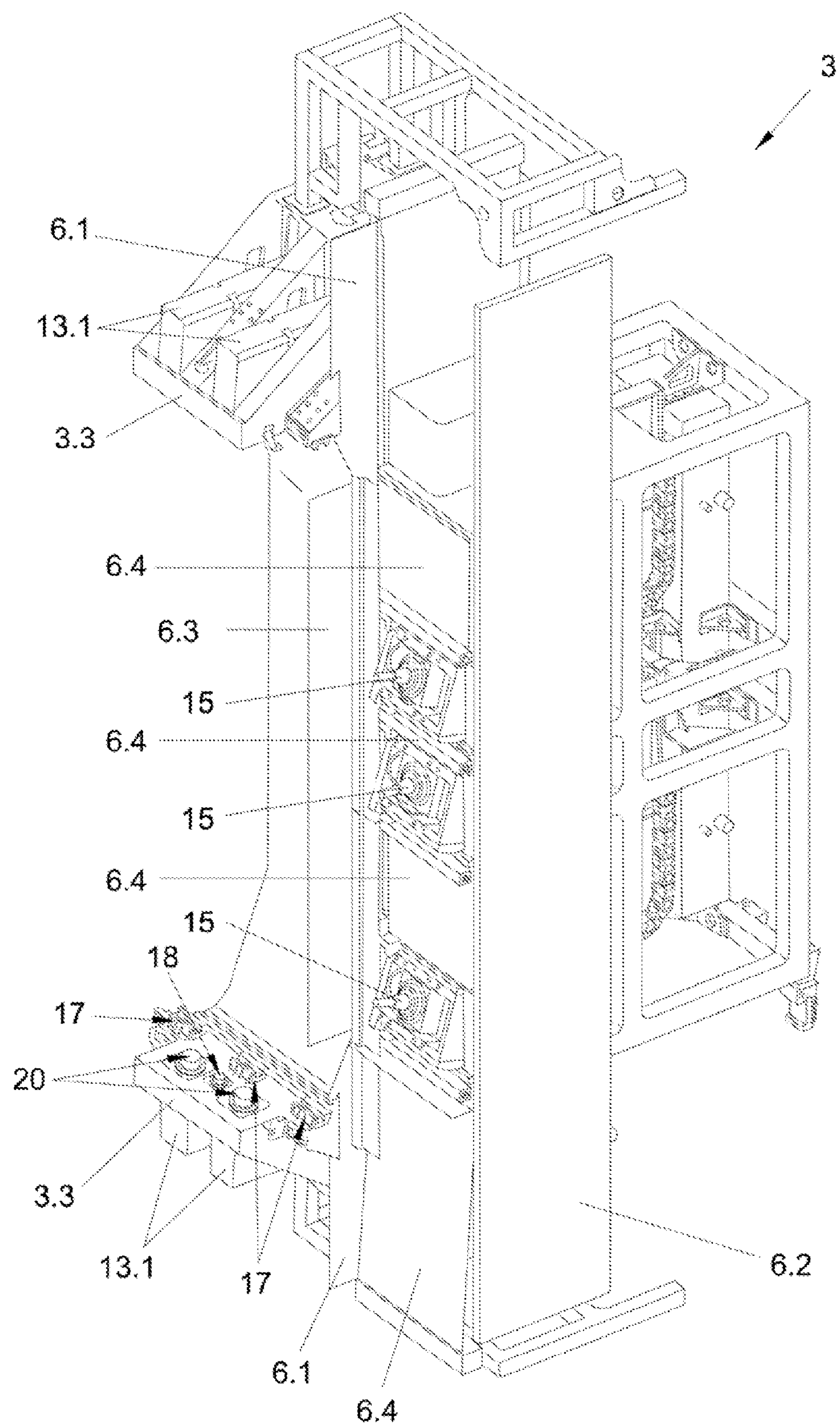
FIG. 4 shows another perspective view of the moving bridge comprised by the milling machine object of the invention.
Figure 5:
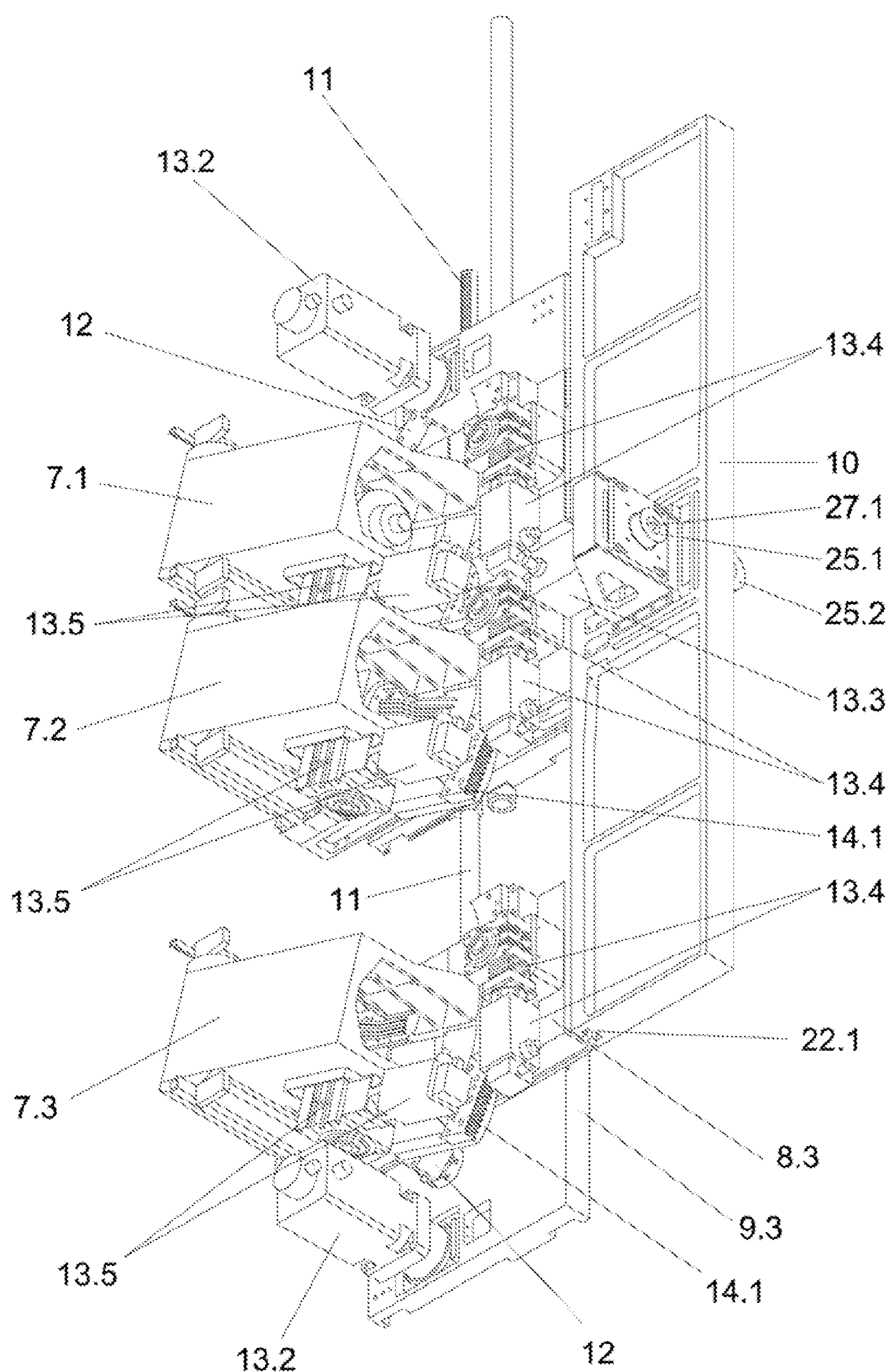
FIG. 5 shows a perspective view of a set of moving elements of the moving bridge.
Figure 6:
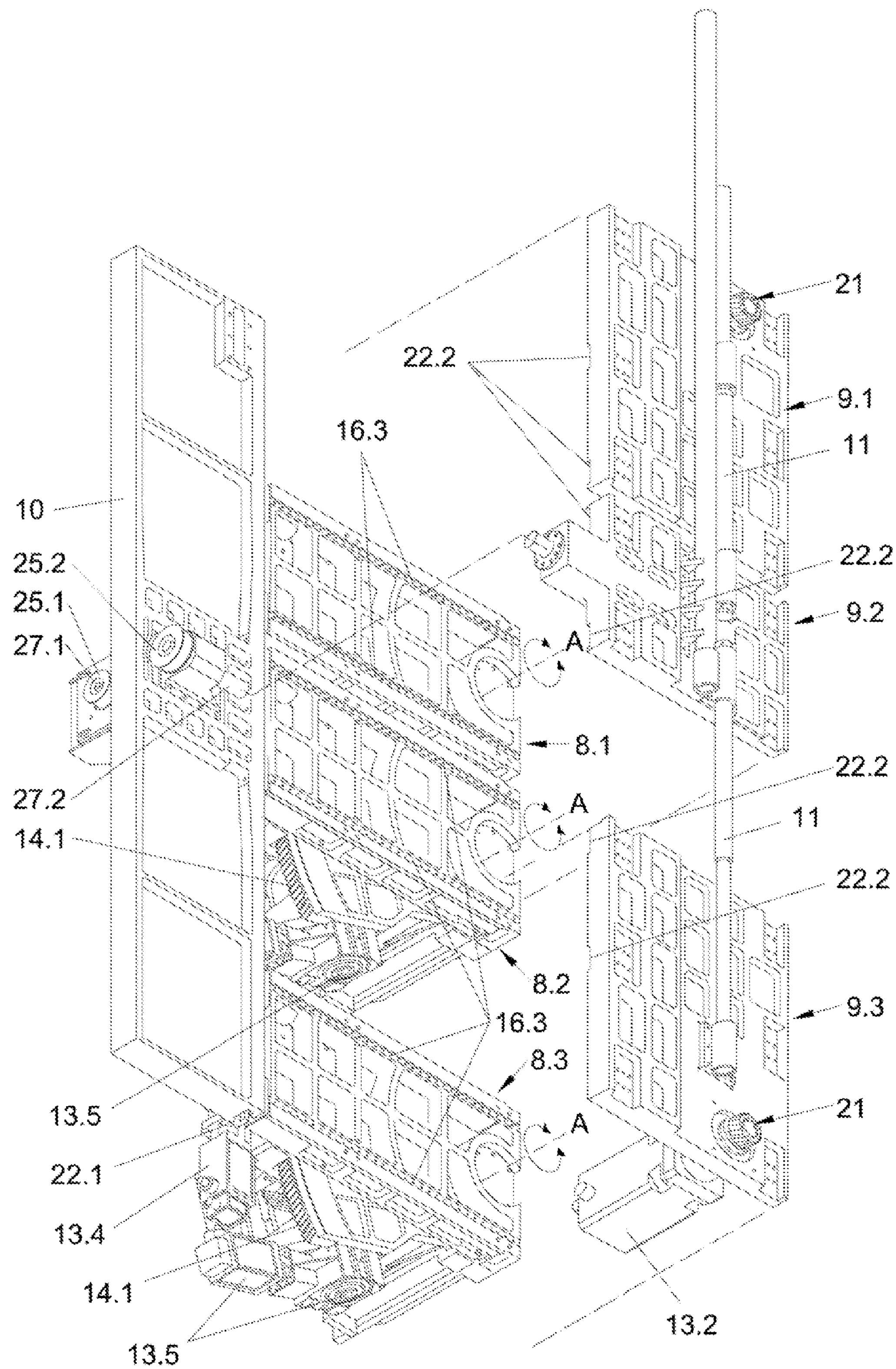
FIG. 6 shows another perspective view of the set of moving elements of the moving bridge.
Figure 7:
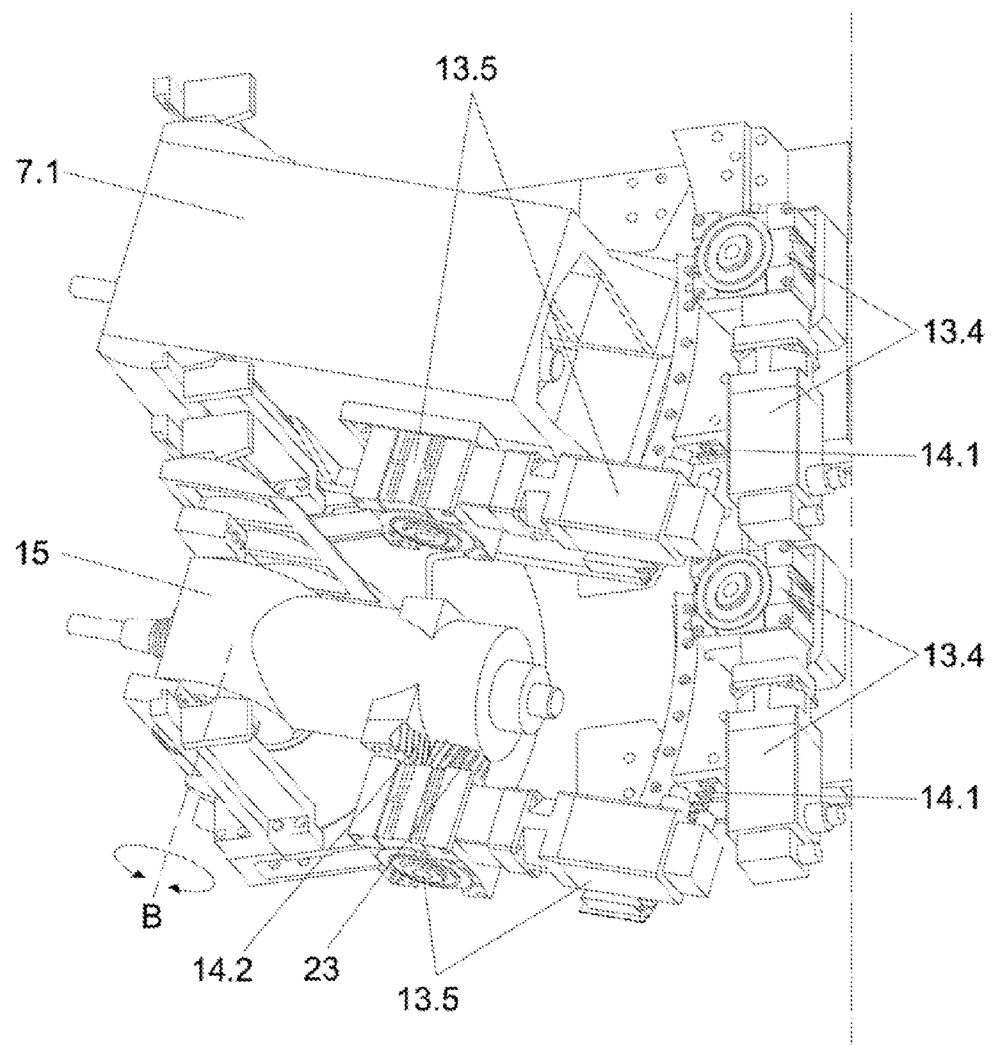
FIG. 7 shows in detail some heads of the milling machine object of the invention.
Figure 8:
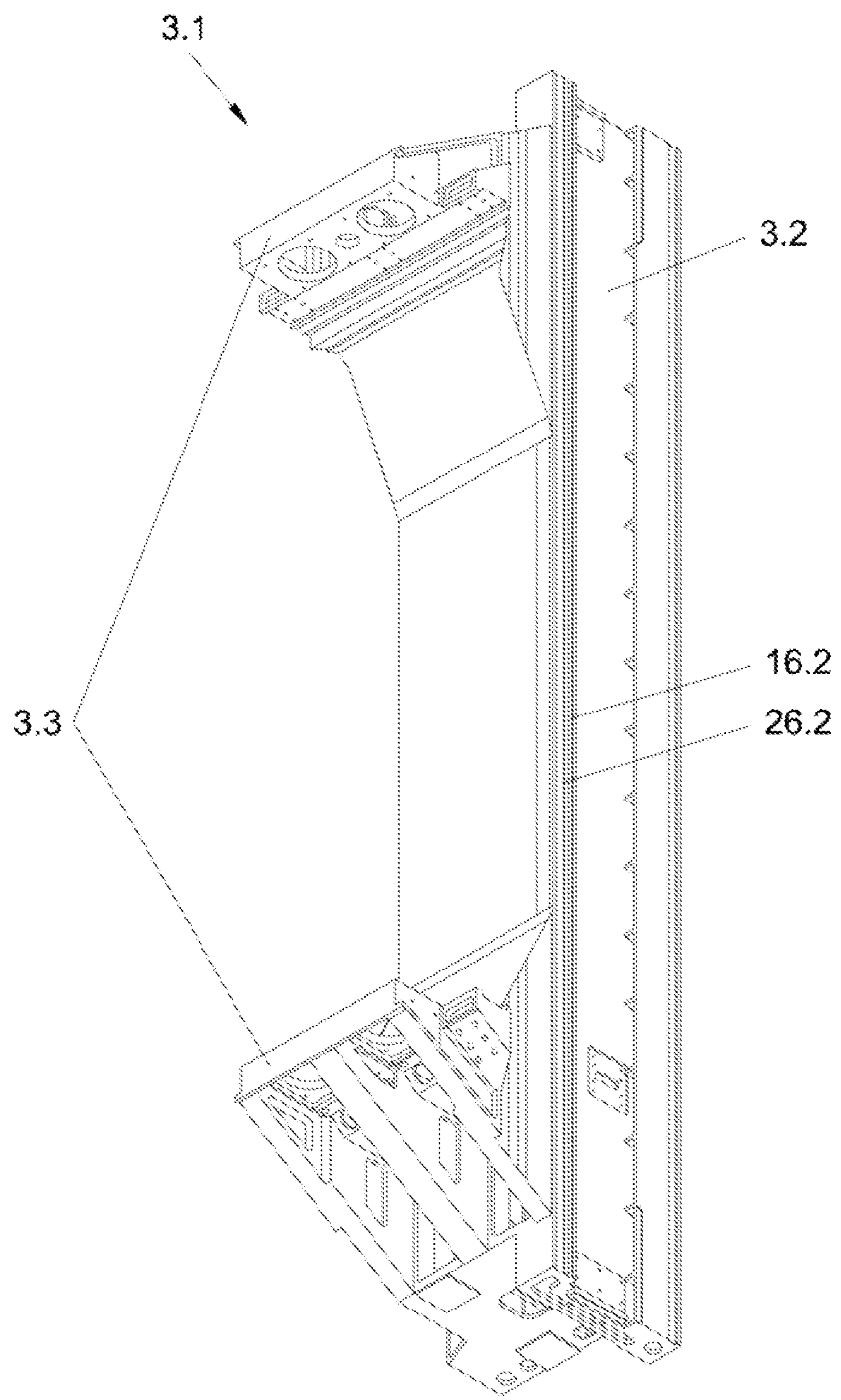
FIG. 8 shows another perspective view of a main structure of the moving bridge together with a reinforcing element.
Figure 9:
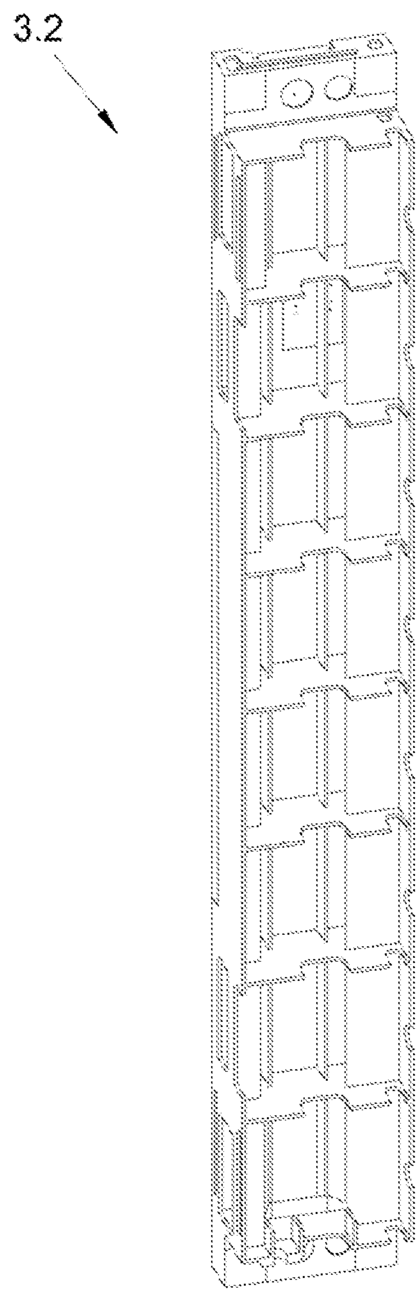
FIG. 9 shows a perspective view of the reinforcing element of the moving bridge.

FIGS. 3 and 4 are perspective views of the moving bridge (3) with all of its components, whilst FIGS. 5, 6 and 7 show the main components of the moving bridge (3) as the heads (7) and the different elements for the driving and movement of the three heads (7). FIG. 8 illustrates the main structure (3.1) which sustains said main components of the moving bridge (3) as well as a reinforcing element (3.2) comprised by the moving bridge (3), which is shown in detail in FIG. 9.

The design of the moving bridge (3) is essential because it supports stress due to gravity and the forces of inertia acting simultaneously, avoiding any type of deformation that affects the precision of the machine. Without compromising rigidity, a moving bridge (3) has been provided which is as light as possible; not just because of the materials used in the components that the moving bridge (3) comprises, but also because of a strict process of calculations, modifications, optimisations and revisions, the amount of material used has been reduced as much as possible.

The material of the components that the moving bridge (3) comprises in order to provide high resistance with a low weight is alloy aluminium, AA7075-T6, which provides a resistance greater than 500 MPa, and which has been subjected to a hard anodised process with the aim of increasing fatigue behaviour. This aluminium has been used principally for components of the heads (7), of carts (8), of cart carriers (9) and a beam-column (10), which are described further on.

To make it lighter in this way, various perforations (19) have been made in all of the areas in which the mechanical tensions of each element make it possible to do so, some of the perforations (19) being shown in FIGS. 2 and 3. The aforementioned studies have also served to optimise the thickness and the placement of reinforcements in the main structure (3.1) of the moving bridge (3), both in the longest section, as well as in the two shortest sections which are perpendicular to the longest one, and which have been called columns (3.3). The reinforcements have principally been introduced in the form of ribs, including the reinforcing element (3.2) which longitudinally covers one of the sides of the main structure (3.1) of the moving bridge (3) which has ribs distributed in order to reduce its weight, not limiting itself to one beam that only provides rigidity.

Another novel aspect of the invention is the design of protections (6), FIGS. 3 and 4, which principally protect the milling machine from shavings and emulsion during the machining process. The protections (6) also fulfil the function of vertically channelling the waste generated in the machining of the workpieces (5) to the disposal tank (24) which extends longitudinally according to the horizontal axis (X) in such a way that it covers the entirety of the course of the moving bridge (3). The design of the protections (6) is principally due to the limitations of space that exists for their placement, the movements interpolated according to the five axes (X, Y, Z, A, B) and the separation between the heads (7) during machining, without forgetting the essential requirement of reducing the value of the mass in movement.

In this way the waste is grouped into a reduced and specific area of the floor of the facilities where the milling machine of the present invention is located, instead of the waste ending up at any of the other four sides of a machine with the work surface arranged horizontally. It is also prevented the waste from being spread over the workpiece itself and affecting the finish in the machining of said part. Moreover, the personnel in the vicinities of the milling machine are protected from dangerous flying waste such as shavings.

The invention preferably comprises a set of fixed protections (6.1), a moving protection (6.2), a hinged protection (6.3) and a set of rolling protections (6.4). During the machining of the workpieces (5) the moving protection (6.2) and the hinged protection (6.3) contribute to channelling the shavings and other waste.

Preferably the fixed protections (6.1) comprise a set of plates and sheets made of aluminium, and the moving protection (6.2) comprises a panel of composite material actuated by pneumatic cylinders for linear movements. The hinged protection (6.3), on the other hand, comprises a panel of aluminium and rubber actuated by pneumatic cylinders for its hinging movement. The rolling protections (6.4), in turn, comprise a set of rubber sweepers and a set of rollers with a case and strip of stainless steel, besides a spring only for rolling thereof, given that it is unrolled by the movement of the heads (7) on the moving bridge (3) covering the space that is created.

The milling machine of the invention comprises a conventional lubrication system adapted to the reduced space existing in the milling machine due to the compactness with which various studies and analyses have enabled it to be designed and built. Several lubrication blocks based on the time, the quantity and the number of points to be lubricated, distributed visibly and accessibly across the length of the bridge, in such a way that they can lubricate all the actuators related with the movements on the five axes (X, Y, Z, A and B).

In this embodiment a felted pinion (18) has been selected, which can be seen in FIG. 4, as an element comprised for the application of lubrication fluid, i.e., a lubricant. Said felted pinion (18) preferably contributes to a smoother and more uniform movement according to the five axes (X, Y, Z, A, B), whilst it takes care of the state of the main mechanical elements which take part to perform the movement of the different elements of the invention.

Said actuators related with the movements on the five axes (X, Y, Z, A, B) are rotating and non-linear, given that linear motors do not have enough strength to provide high accelerations. Likewise, the linear motors have problems of implementation due to the fact that during the movement of said actuators a great deal of heat is produced which it is necessary to cool with an appropriate cooling system, which increases the cost of both installation and of maintenance. Therefore the use of rotating actuators provides a reduction of space, a reduction of costs and an optimal performance to reach the high accelerations which the machine of the present invention is to be subjected to when operating.

One of the more important characteristics of the invention is the movement according to the horizontal axis (X), which is the movement of the moving bridge (3) along the frame (2) in such a way that the longest section which joins the two columns (3.3) of the moving bridge (3) is moved parallel to the work surface (2.1).

For this movement the milling machine object of the present invention comprises linear guides with recirculating rollers because they are especially suitable for movements of large loads and with requirements of high precision. Additionally for said movement according to the horizontal axis (X), it also comprises slides (17) which are located in the columns (3.3), where those of one of the columns (3.3) can be seen in FIG. 4, and horizontal rails (16.1) which are located in the frame (2) together with horizontal racks (26.1), the upper horizontal rail (16.1) and the upper horizontal rack (26.1) being shown in FIG. 2.

For this movement of the moving bridge (3) along the frame (2) the present invention also comprises four drive cases (13.1) of the horizontal axis (X), each of said drive cases comprising a precision gearbox. In this way there are two drive cases (13.1) of the horizontal axis (X) in each column (3.3), as shown in FIG. 4. Each one of the drive cases (13.1) of the horizontal axis (X) is driven by a rotating servomotor which transmits a rotating movement to a gear shaft (20) of the horizontal axis (X) which engages to the horizontal racks (26.1). The protection of this horizontal rack (26.1) and of the previously mentioned linear guides is carried out by rolling protections (6.4).

The milling machine comprises at least one system that enables the electronic control of the rotation of the rotating servomotors of each drive case (13.1) of the horizontal axis (X). Said system also makes it possible to drive and regulate the lubrication system which by means of a motor pump that sends the lubrication fluid, i.e. the lubricant, cyclically and controlling the frequency and amount of the lubricant, to the felted pinion (18) which contacts the horizontal racks (26.1) which take part in the movement of the moving bridge (3) along the frame (2). The felted pinion (18) is preferably arranged between the two gear shafts (20) of the horizontal axis (X) of each column (3.3) of the moving bridge (3) which drive the aforementioned horizontal rack (26.1).

Some stops (2.3) have also been included at both ends of its path, which assures that the moving bridge (3) does not come out of its course. Preferably said stops (2.3) comprise a means of dampening, such as a spring, a material that absorbs impacts or a combination of both.

On the other hand there is the movement according to the vertical axis (Y), this is to say the movement of the cart carriers (9), preferably an upper cart carrier (9.1), central cart carrier (9.2) and a lower cart carrier (9.3), one for each head (7), which have been analysed for the purpose of providing rigid and light structures at the same time.

As it can be seen in FIG. 5, for said movement the present invention comprises two drive cases (13.2) of the vertical axis (Y), each one of which comprises a precision gearbox. A precision gearbox is assembled in the upper cart carrier (9.1) and another one in the lower cart carrier (9.3), with each one of them being driven by a rotating servomotor. The rotating servomotors are those which transmit the rotating movement to two gear shafts (21) of the vertical axis (Y) which drive a vertical rack (26.2) placed alongside a vertical rail (16.2) of the longest section of the moving bridge (3), and more specifically in one of the faces of the reinforcing element (3.2), as shown in FIG. 8.

As also happens with the rotating servomotors of each drive case (13.1) of the horizontal axis (X), the machine object of the present invention makes it possible to electronically control the rotation of the rotating servomotors of each drive case (13.2) of the vertical axis (Y), as well as the driving and regulating of the lubrication system which sends the lubricant to the felted pinion (18) by means of a motor pump which contacts the vertical rack (26.2) which takes part in the movement of the cart carriers (9) along the moving bridge (3). This aforementioned vertical rack (26.2) and its corresponding guides are protected, as in the case of those which contribute to the movement of the moving bridge (3) along the frame (2), by means of rolling protections (6.4), FIG. 4.

In the movements of the cart carriers (9) according to the vertical axis (Y), the milling machine comprises a locking and unlocking system, this is to say an interlocking system with a HIRTH-type tooth. This locking and unlocking system comprises two hydraulic cylinders (12), see FIG. 5, for its actuation, one in the upper cart carrier (9.1) and the other in the lower cart carrier (9.3). Besides the locking and unlocking system comprises a shaft (11), FIG. 6, which joins the upper cart carrier (9.1) with the central cart carrier (9.2) and another shaft (11) which joins the central cart carrier (9.2) with the lower cart carrier (9.3), in such a way that the hydraulic cylinders (12) prevent the upper cart carrier (9.1) and the lower cart carrier (9.3) from moving too close to or too far from the central cart carrier (9.2) following said shafts (11).

What is achieved by means of said shafts (11) is to separate the upper cart (8.1) and the lower cart (8.3) with respect to the central cart (8.2), thus permitting the carts to move independently of each other in the direction of the vertical axis (Y), carrying out the machining by panoplies.

This is to say that by means of the hydraulic cylinders (12) which comprise the aforementioned locking and unlocking system, the movement and/or the fastening of the position of the upper (9.1) and lower (9.3) cart carriers is carried out in such a way that it is also fastened the position of an upper cart (8.1) and a lower cart (8.3). Also, at the same time, by means of the gear shafts (21) of the vertical axis (Y) and the fastening of the position of the upper (9.1) and lower (9.3) cart carriers, the movement of the three carts (8.1, 8.2, 8.3) together with the beam-column (10) is carried out according to the vertical axis (Y).

The fastening of the position of the central cart (8.2) and the subsequent movement of the upper (8.1) and lower (8.3) cart carriers with respect to the central cart (8.2) is carried out before starting the machining, and when said carts (8.1, 8.2, 8.3) are found in the pre-established position for the machining, the interlocking system is activated so that the carts (8.1, 8.2, 8.3) do not separate from each other until the machining is finished.

The three cart carriers (9), FIG. 6, in addition to the shafts (11), can have some slides in their rear, which have not been included in the figures, through those it is contributed to the sliding of the three cart carriers (9) on the moving bridge (3). On the other hand, at the front part the three cart carriers (9) have some depth grooves (22.2), as guides, and some slides (17), not shown in the figures, required for the movement of three carts (8) in the Z direction that will be described below.

On the other hand there is the movement according to the depth axis (Z), in other words, the movement of the three carts (8) in such a way that they are moved towards or moved away from the workpiece (5) fastened to the vacuum table (2.2).

The three carts (8), an upper cart (8.1), a central cart (8.2) and a lower cart (8.3) are adjoined by the beam-column (10). The heads (7) of the machine object of the invention are fastened to these three carts (8), and the three carts (8) are at the same time fastened to the beam-column (10). Said three carts (8) are also fastened to the three cart carriers (9), the upper cart (8.1) to the upper cart carrier (9.1), the central cart (8.2) to the central cart carrier (9.2), and the lower cart (8.3) to the lower cart carrier.

As shown in FIG. 6, the central cart (8.3) is fastened and immobilised with respect to the beam-column (10) in the directions (Y) and (Z), whereas the upper cart (8.1) and the lower cart (8.3) are adjoined to the beam-column (1) by a vertical groove (22.1) parallel to the previously mentioned shafts (11). An end of each one of the upper (8.1) and lower (8.3) carts is inserted in this groove, in such a way that these carts (8.1, 8.3) can be moved along the beam-column (10) for the movement according to the vertical axis (Y) in order to carry out the machining by panoplies, at the same time pulling the corresponding upper (9.1) and lower (9.3) cart carriers, in addition to the movement about this vertical axis (Y) that is carried out by the set formed by the heads (7), the three carts (8), the three cart carriers (9) and the beam-column (10).

For the movement according to the depth axis (Z) the three carts (8) comprise some depth rails (16.3) coinciding with the depth grooves (22.2), perpendicular to the shafts (11), along the face by which they are joined to the cart carriers (9). In this way neither of the three cart carriers (9) is moved according to the depth axis (Z).

For these movements according to the depth axis (Z), the milling machine object of the invention comprises a rotating servomotor (13.3) of the depth axis (Z), which drives a drive shaft (27.1) which comprises a first pulley (25.1). The elements for this movement besides the rotating servomotor (13.3) of the depth axis (Z) and the first pulley (25.1), is a second pulley (25.2) located at one end of a feed spindle (27.2), shown clearly in FIG. 6, and a belt, as a means of mechanical transmission, not shown in the figures. This belt joins both pulleys (25.1, 25.2), in such a way that the rotating movement coming from the servomotor (13.3) of the depth axis (Z) located in the face of the beam-column (10) where the heads (7) are located is transmitted to the other face of the beam-column where the shafts (11) are located moving the driving spindle of the depth axis (Z).

The main reason for transmitting this rotating movement from one face of the beam-column (10) to the other is to reduce the total volume of the elements of the moving bridge (3), grouping all of the possible elements on the same face one on top of the other. Various analyses and studies have been carried out to achieve a high degree of compactness of all of the elements comprised by the moving bridge (3) not only to reduce the occupied floor space, but also because it reduces the stress that the moving bridge undergoes in being fastened to the frame (2). The lubrication system of the milling machine also provides lubricant fluid to the mechanical transmission elements for the movements according to the depth axis (Z).

The first axis of rotation (A), seen in FIG. 6, is the axis about which each one of the three heads (7) rotates independently from each other, with the pivot and grip points arranged on the carts (8). In order to carry out these rotations the present invention comprises a drive case (13.4) of the first axis of rotation (A) for each head (7), each one of these drive cases (13.4) comprising a precision gearbox driven by a rotating servomotor which transmits an electronically controlled rotating movement, to a pinion of the first axis of rotation (A), not shown in the figures, which drives a crown wheel (14.1) of the first axis of rotation (A).

For the rotations of the head (7) according to the first axis of rotation (A), the lubrication system provides the appropriate amounts of lubricant, with the appropriate frequency so that the mechanical transmission elements do not experience undesired friction, whilst favouring smooth and uniform rotating movements.

The second axis of rotation (B), shown in FIG. 7, is the axis according to which a machining spindle (15) located inside each one of the heads rotates with independent mobility between them. Said machining spindle (15) is preferably a high velocity electric swindle, which is to say that it works at approximately 24,000 rpm. As each machining spindle (15) independently rotates according to the second axis of rotation (B) the versatility of the machine is increased, thus being possible to machine with an additional degree of freedom.

In this case the present invention comprises one drive case (13.5) of the second axis of rotation (B) for each head (7), each one of these in turn comprising a precision gearbox driven by a rotating servomotor. As happens in the drive cases (13.4) of the first axis of rotation (A), the precision gearbox of each drive case (13.5) of the second axis of rotation (B) transmits a rotation, in this case, to a pinion (23) of the second axis of rotation (B), FIG. 7, which engages with a rack (14.2) of the second axis of rotation (B) arranged on the electric spindle (15) of each head (7). The control, of at least these movements, is carried by an impulse receiver comprised by each one of the servomotors.

Having thus described the nature of the invention, it is herewith stated for all intents and purposes that the latter is not limited to the precise details of this presentation, but, on the contrary, shall be subject to any modifications deemed appropriate, so long as they do not alter the essential characteristics thereof.

The invention claimed is:

1. A milling machine comprising:
- a frame including a work surface arranged in a vertical plane;
- a C-shaped moving bridge;
- at least three heads, each of which comprises a machining spindle; and
- five movement axes arranged in such a way that:
  - the moving bridge is moved along the frame according to a horizontal axis,
  - each head is independently moved on the moving bridge according to a vertical axis perpendicular to the horizontal axis,
  - each head is moved on the moving bridge in order to be moved towards or moved away from the work surface according to a depth axis perpendicular to the horizontal axis and to the vertical axis,
  - each head independently performs rotating movements according to a first axis of rotation, and
  - each machining spindle independently performs rotating movements according to a second axis of rotation, such that each machining spindle is moved independently according to at least three of the five axes.

2. The milling machine, according to claim 1, wherein each of the four axes comprises at least one drive case.

3. The milling machine, according to claim 2, wherein each drive case comprises at least one precision gearbox.

4. The milling machine, according to claim 3, wherein each precision gearbox comprises at least one rotating servomotor.

5. The milling machine, according to claim 4, wherein the rotating movement which each rotating servomotor transmits is controlled electronically.

6. The milling machine, according to claim 1, further comprising:
- at least two linear guides with recirculating rollers, in order to provide high precision to the milling machine for the movement of large loads,
- at least one slide on the moving bridge,
- at least one horizontal rail on the frame, for the movement of a slide,
- at least one gear shaft of the horizontal axis on the moving bridge driven by a rotating servomotor, and
- one horizontal rack for each gear shaft of the horizontal axis, in order to transmit the movement to the moving bridge according to the horizontal axis, such that the moving bridge is moved along the frame according to the horizontal axis.

7. The milling machine, according to claim 1, further comprising:
- at least one vertical rail,
- at least two gear shafts of the vertical axis driven by rotating servomotors,
- one vertical rack for each gear shaft of the vertical axis, for moving the moving bridge according to the vertical axis, and
- a locking and unlocking system for the relative movement of both the upper and lower cart carrier with respect to the central cart carrier, wherein the locking and unlocking system comprises:
  - at least two shafts joining the upper and lower cart carriers to the central cart carrier, and
  - at least two hydraulic cylinders for the actuation of the corresponding shafts, such that each head, joined to the corresponding cart carrier through the respective cart, is moved on the moving bridge according to the vertical axis.

8. The milling machine, according to claim 1, further comprising:
- at least one depth groove for each head, located on the corresponding cart carrier,
- at least one depth rail for each head, located on a face of the corresponding cart opposite to where heads are located, coinciding with the corresponding depth groove,
- a rotating servomotor of the depth axis, located on a face of a beam-column hosting the carts where heads are located,
- a drive shaft driven by a rotating servomotor, wherein the drive shaft includes a first pulley,
- a feed spindle located on a face of the beam-column opposite to where the heads are located and fastened to the cart carriers, and
- a second pulley located on one end of the feed spindle joined to the first pulley by means of mechanical transmission, such that activation of the rotating servomotor causes the driving of the feed spindle, causing the heads to move on the moving bridge according to the depth axis.

9. The milling machine, according to claim 1, further comprising:
- at least one pinion of the first axis of rotation for each head and a crown wheel for each of the heads, such that each head rotates independently according to the first axis of rotation.

10. The milling machine, according to claim 1, further comprising:
- at least one pinion of the second axis of rotation for each machining spindle, and
- a rack of the second axis of rotation, such that each machining spindle rotates independently according to the second axis of rotation.

11. The milling machine, according to claim 1, further comprising a felted pinion as an element for applying lubricant.

12. The milling machine, according to claim 1, further comprising protections selected amongst fixed protections, moving protections, hinged protections, rolling protections and combination of the above.

13. The milling machine, according to claim 1, wherein at least one of the protections selected amongst fixed, moving, hinged, and rolling protections, and combination of the above, serves as a vertical channel for waste from the machining process.

14. The milling machine, according to claim 1, further comprising a handling cell that may be moved in three mutually perpendicular directions.

15. The milling machine, according to claim 1, further comprising at least one vacuum table arranged parallel over the work surface in order to hold the workpieces to be machined using depression.

* * * * *